US009633381B2

(12) United States Patent
McKerlich et al.

(10) Patent No.: US 9,633,381 B2
(45) Date of Patent: Apr. 25, 2017

(54) MOBILE APPLICATION MONITORING SYSTEM

(75) Inventors: Ian McKerlich, Sammamish, WA (US); Warren McNeel, Kirkland, WA (US); Venetia Espinoza-Dawson, Bellevue, WA (US); Marvin E. Storey, Denver, CO (US); James S. Zerbe, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 1202 days.

(21) Appl. No.: 11/971,544

(22) Filed: Jan. 9, 2008

(65) Prior Publication Data

US 2009/0177567 A1    Jul. 9, 2009

(51) Int. Cl.
  *G06Q 30/04* (2012.01)
  *H04L 29/06* (2006.01)
  *G06Q 30/02* (2012.01)
  *H04L 12/853* (2013.01)
  *G06Q 40/00* (2012.01)

(52) U.S. Cl.
  CPC ......... *G06Q 30/04* (2013.01); *G06Q 30/0283* (2013.01); *G06Q 40/00* (2013.01); *H04L 47/2416* (2013.01); *H04L 65/60* (2013.01)

(58) Field of Classification Search
  CPC .. H04L 47/2416; H04L 65/60; G06Q 30/0283
  See application file for complete search history.

(56) References Cited

U.S. PATENT DOCUMENTS 6,778,836 B2 *   8/2004   Kawakami ................. 455/456.1
6,968,175 B2    11/2005   Raivisto et al.
2002/0095330 A1 *  7/2002   Berkowitz et al. ............. 705/14
(Continued)

FOREIGN PATENT DOCUMENTS

WO    WO-2009089374 A1    7/2009

OTHER PUBLICATIONS

"VeriSign Announces Streamlined Wireless Billing and OSS System; speed SUITE Solution Unifies Access to Multiple Appications and Databases, Reduces Operational costs and compleity for Carriers." PR Newswire. PR Newswire Association LLC 2003, HighBeam Research. Mar. 3, 2010 <http://www.highbeam.com>.*
(Continued)

*Primary Examiner* — Mohammad Z Shaikh
*Assistant Examiner* — Mary Gregg
(74) *Attorney, Agent, or Firm* — Perkins Coie LLP

(57) ABSTRACT

A method and system to test, monitor, and share revenue associated with third-party software applications operating on mobile devices over a network operator's wireless network. An application may be tested by the mobile application monitoring system to simulate the expected load of the application on a mobile device and the wireless network utilized by the mobile device, and to determine any services utilized by the application. Based on the simulation, the system determines a compensation arrangement under which revenue associated with the application will be shared between the network operator and the application provider. In some embodiments, the compensation arrangement is determined from a variable reward table. Revenue is shared inversely with an application's impact on customers and on the network operator.

54 Claims, 4 Drawing Sheets

(56) References Cited

U.S. PATENT DOCUMENTS

| | | | |
|---|---|---|---|
| 2002/0099842 A1* | 7/2002 | Jennings et al. | 709/231 |
| 2002/0198847 A1 | 12/2002 | Fahraeus | |
| 2003/0076940 A1* | 4/2003 | Manto | 379/114.05 |
| 2003/0112933 A1 | 6/2003 | Snelgrove | |
| 2003/0166398 A1* | 9/2003 | Netanel | 455/410 |
| 2004/0093595 A1* | 5/2004 | Bilange | 717/171 |
| 2005/0028188 A1 | 2/2005 | Latona et al. | |
| 2006/0036494 A1 | 2/2006 | Aufricht et al. | |
| 2006/0200425 A1* | 9/2006 | Steele et al. | 705/64 |
| 2006/0242267 A1 | 10/2006 | Grossman | |
| 2007/0073608 A1* | 3/2007 | Garcia | 705/37 |
| 2007/0074167 A1 | 3/2007 | Cohrs et al. | |
| 2007/0167174 A1 | 7/2007 | Halcrow et al. | |
| 2007/0174490 A1* | 7/2007 | Choi et al. | 709/246 |
| 2007/0299789 A1* | 12/2007 | Young | 705/400 |
| 2008/0052396 A1* | 2/2008 | Tell et al. | 709/226 |
| 2008/0147789 A1 | 6/2008 | Wing et al. | |
| 2008/0153422 A1* | 6/2008 | Gilbertas et al. | 455/67.11 |
| 2008/0167033 A1* | 7/2008 | Beckers | 455/432.3 |
| 2008/0275971 A1* | 11/2008 | Pretlove et al. | 709/222 |
| 2008/0300974 A1 | 12/2008 | Bhandari et al. | |
| 2010/0003923 A1 | 1/2010 | McKerlich et al. | |
| 2015/0170214 A1* | 6/2015 | Pokonosky | G06Q 30/02 705/14.64 |

OTHER PUBLICATIONS

Microsoft Press: Computer Dictionary 2nd ed. ; 1994; 3 pages; ISBN 1-55615-597-2.*

Pricing, billing and interconnection in an Next Generation Networks (NGN) environment by Tim Kelly; 29 pages; Mar. 1, 2007.*

Application Service Providers: System Development Using Services over the Net by Takahasi et al.; 51 pages; Jun. 10, 2004.*

International Search Report and Written Opinion for Application No. PCT/US2009/030473; Applicant: T-Mobile USA, Inc.; Date of Mailing: Feb. 26, 2009, 11 pages.

* cited by examiner

MOBILE APPLICATION MONITORING SYSTEM

BACKGROUND

Although there has been an explosion of software applications that operate on personal or business computers coupled to broadband networks such as cable, DSL, or satellite, to date there has not been a corresponding increase in software applications that operate on mobile devices over mobile networks such as cellular networks. In part, the disparity in number of applications may be caused by the difference in form and computational capability of the accessing device. Personal or business computers are typically more powerful and have a greater display size which facilitates the development of applications. This distinction has started to lessen, however, with the advent of smart phones that have significantly greater processing power and greater screen sizes. In part, the disparity in number of applications may be caused by the fees associated with network use. Fixed broadband subscribers typically pay a flat rate for unlimited broadband use from a personal or business computer. In contrast, mobile device users typically pay a variable amount that depends on the actual bandwidth utilized by the device. Because mobile device users are typically required to pay for bandwidth charges in mobile applications, the number of applications for mobile devices may not increase significantly until an efficient way to charge for such applications is developed.

DETAILED DESCRIPTION

Figure 1:
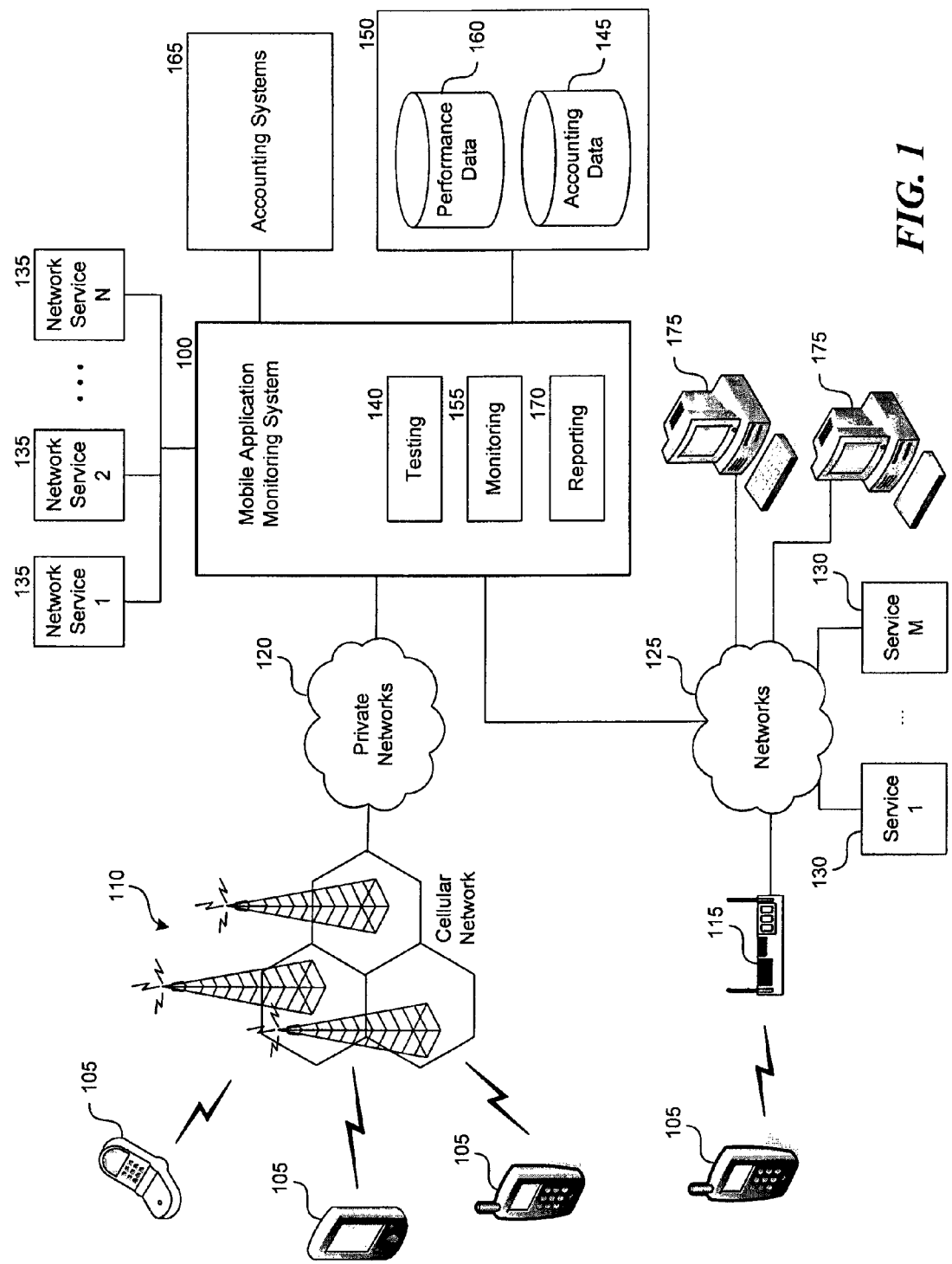
FIG. 1 is a block diagram of a representative environment in which a mobile application monitoring system operates.

A method and system to test, monitor, and share revenue associated with third-party software applications operating on mobile devices over a network operator's wireless network is disclosed (hereinafter referred to as the "mobile application monitoring system"). Before an application is allowed to be installed on a mobile device, the application may be tested by the mobile application monitoring system to simulate the expected load of the application on a mobile device, to simulate the expected load of the application on the wireless network utilized by the mobile device, and to determine any services utilized by the application. Based on the simulation, the system determines a compensation arrangement under which revenue associated with the application will be shared between the network operator and the application provider. Provided the application is otherwise in compliance with network operator requirements, the application is allowed to be distributed to mobile devices operating over the wireless network.

In some embodiments, the compensation arrangement is determined from a variable reward table. One axis of the variable reward table measures the complexity and/or value of services that the application utilizes. The other axis of the variable reward table measures the amount of network and/or device resources that are consumed by the application. Each axis of the table is divided into ranges, resulting in a grid of cells with each cell reflecting a different cost of running the application over the network. Each cell in the table may be assigned a revenue share or other compensation value that the application provider agrees to share with the network operator in order for the application provider's application to run on the network. In some embodiments, the application provider will receive a larger amount of revenue the less the complexity or value of services that the application relies upon and the less impact the application has on the mobile devices and/or network. Conversely, the application provider will receive a smaller amount of revenue the greater the complexity or value of services that the application relies upon and the greater the impact the application has on the mobile device and/or network. By sharing revenue inversely with an application's impact on customers and on the network operator, the application provider is economically encouraged to efficiently code their application and make beneficial design choices during development.

In some embodiments, the mobile application monitoring system monitors the performance of an application after the application has been installed on mobile devices and begins operating over the network. The actual performance of the application is compared with the predicted performance of the application. If the actual performance of the application is different than the expected performance, the revenue sharing arrangement under which the application is allowed to operate over the network may be adjusted.

In some embodiments, the mobile application monitoring system generates a real-time or near real-time dashboard for an application provider. The dashboard allows the application provider to monitor the performance of the application over the network. The dashboard may present a textual or graphical representation of the variable reward table and where the application is currently operating in the variable reward table. By displaying an application's location in the variable reward table to the application provider, the provider is able to assess whether it is worthwhile to optimize the application in one or more ways in order to move to a different cell in the variable reward table and receive a greater revenue share for the application.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 is a block diagram of an environment in which a mobile application monitoring system 100 operates. Mobile devices 105 are able to access telecommunication services offered by a network operator through a cellular network 110 or through one or more wireless access points 115 coupled to network operator systems (not shown) through private networks 120 or public/private networks 125, such as the Internet. The network operator may provide a broad range of telecommunication services to users of the mobile devices, such as voice services, access to the Internet, SMS messaging, purchase and delivery of ringtones, games, etc.

One or more third-party software applications may be added to mobile devices that operate over the operator network. Applications may be games, media or media sharing programs, mail or communication programs, educational, financial or productivity programs, mapping or location-based programs, or any other program, service or functionality that users may find valuable on a mobile device. The applications may be Java-based, flash-based, may operate in HTML and other browser environments, or may operate in any native environment that currently exists or will be developed for mobile devices in the future. During operation, the applications may rely upon one or more services 130 that are accessible through network 125. The services may be hosted by the application provider or by third-parties. For example, an application on a mobile device may rely on Google maps to implement a directions service. The applications may also rely on one or more value-added network services 135 that are hosted by the network operator. For example, the network operator may offer a service that provides the location of a mobile device, a service that provides demographic information about the mobile device user, a service that provides a user state or "presence" of the handset and the corresponding user, or a service that authenticates the identity of the user. The applications may also rely on one or more device services (not shown) that are present on the mobile device. For example, the application may access a proprietary interface that is provided by the network operator on the mobile device for purposes of delivering content in a uniform manner to a user. The services may be developed by the network operator or by the application provider or third-party and hosted by the network operator. The services are accessed by making appropriate calls to the services using an API (application program interface) defined by the network operator or third party. The software applications may combine the various services to implement new and beneficial functionality for consumers using the mobile devices.

Various fees may be imposed on consumers for access to and use of the applications on the mobile devices. A consumer may be charged a flat monthly fee for use of an application (e.g., $4/month), a per-use fee for use of an application's functionality (e.g., $0.50 for each set of directions to a location), a bundled fee for use of a group of applications (e.g., $200/year for a suite of programs), or any combination of charges. Alternatively or in addition to the fee, the cost of an application may be covered in part or in full by advertising. That is, the cost of the application may be borne by one or more advertisers that agree to pay for leads to consumers that are generated by the application. The incoming fees and/or advertising revenue associated with the application are collected by the network operator or the application provider and shared between the network operator and the application provider in a manner that will be described in additional detail here.

The mobile application monitoring system 100 monitors the performance of the third-party applications on mobile devices and determines a compensation arrangement under which revenue attributable to an application will be shared between the network operator and the application provider. As will be described in additional detail herein, the mobile application monitoring system 100 includes a number of modules to facilitate such monitoring and revenue sharing. A testing module 140 initially tests an application to assess the impact of the application on the network and device. While such testing module is shown as being integral with the mobile application monitoring system, the testing may be outsourced to another party. Based on the testing results, the mobile application monitoring system determines an appropriate revenue sharing arrangement for the application. As will be described in additional detail herein, the revenue sharing arrangement may be determined by a variable reward table that is stored in an accounting data set 145 within data storage area 150. If testing is unable to be completed, or if the results of the testing are inconclusive as to the impact of the application, the mobile application monitoring system may assign a default revenue sharing arrangement for the application. Such a default revenue sharing arrangement may be modified when actual performance information about the application becomes available.

When an application has been approved for distribution, the application may be installed by one or more users on mobile devices 105. During operation, the application may access one or more network services 135, one or more third-party services 130, or one or more device services present on the mobile device. A monitoring module 155 monitors the performance of a particular application across all users, including the amount of bandwidth consumed by the application and the number and type of requests made by the application to network, third-party, or device services. Monitoring may also include instantaneous, peak, average, and cumulative statistics of factors such as upstream or downstream bandwidth or the number of messages or other packets related to a particular application. Performance data about the performance of the application is stored by the monitoring module in a performance data set 160 within data storage area 150.

On a periodic or continuous basis, the monitoring module 155 determines whether the application is operating within the performance boundaries of the revenue sharing arrangement. The measured performance data is analyzed to determine whether the performance impact exceeds or falls short of the impact associated with the revenue sharing arrangement. As will be discussed in further detail herein, if the performance of an application materially exceeds or falls short of the predicted impact, the revenue sharing arrangement associated with the application may be adjusted accordingly.

The mobile application monitoring system transmits the information necessary to share application revenue between the network operator and the application provider to the network operator's accounting systems 165. The accounting systems bill users for the use of the application. The accounting systems also determine how much compensation is to be paid to the application provider in accordance with the revenue sharing rules, and periodically remits the appropriate amount to the application provider. Those skilled in the art will appreciate that revenue can be paid to the application provider under a variety of arrangements. For example, the revenue may be paid based on the amount billed to users during the previous month, or revenue may be paid only after receipt of payment from users. In some embodiments, rather than the network operator collecting revenue associated with an application, the application provider may collect revenue directly from users. The application provider periodically remits the compensation that is to be paid to the network operator in accordance with the revenue sharing rules. In some embodiments, the revenue associated with an application may be in part or entirely derived from advertising or other sponsorship. The advertising may be collected by the network operator, the application provider, or third parties that distribute the application.

The mobile application monitoring system 100 also contains a reporting module 170 that analyzes and formats the performance and accounting data and enables the system operator or the application provider to review the performance of the application. As will be discussed in further detail herein, the reporting module 170 may present the data in a variety of formats to the application providers. The application providers may access the data over a network connection using remote computers 175.

Figure 2:
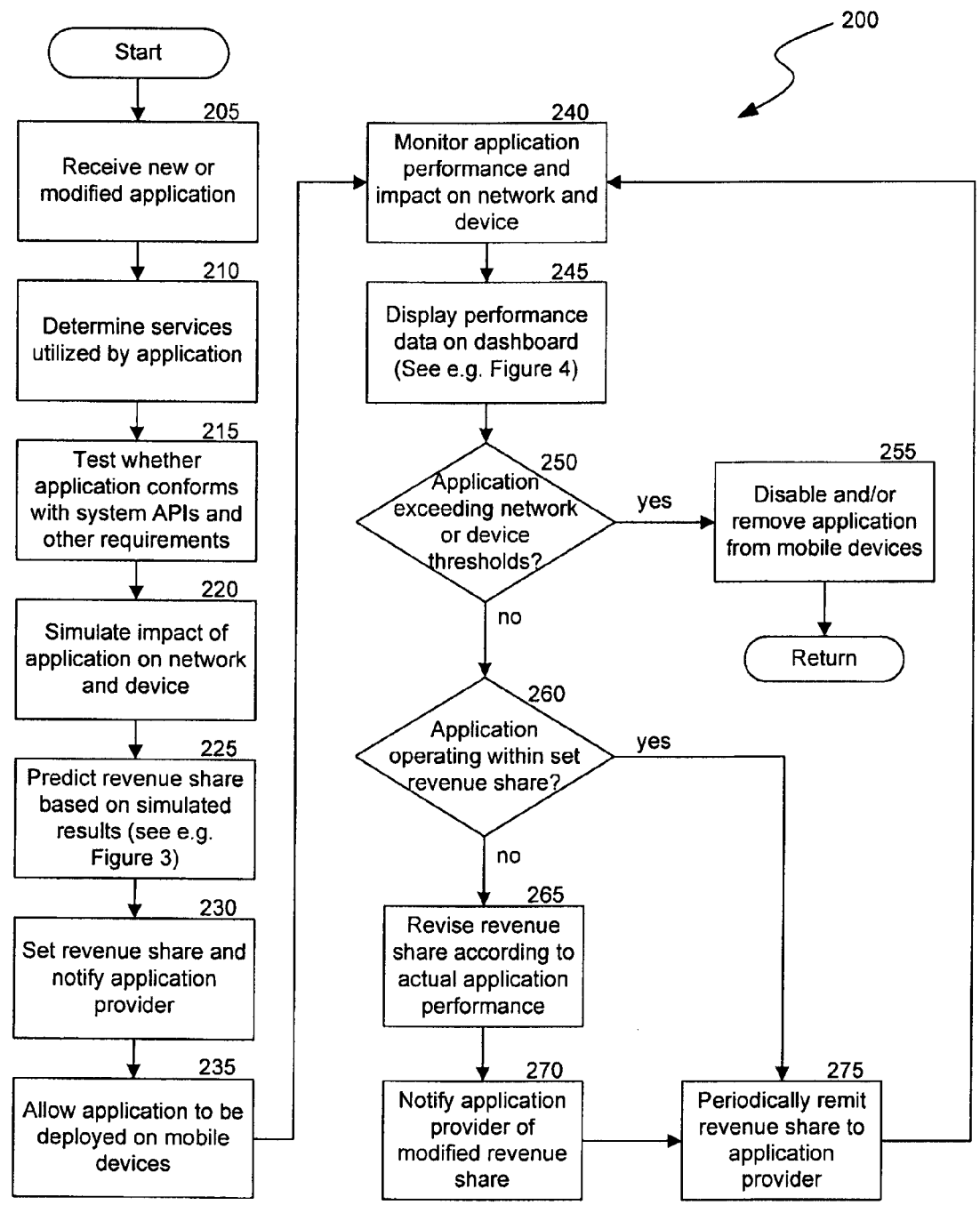
FIG. 2 is a flow chart of a testing, monitoring, and compensation process implemented by the mobile application monitoring system.

FIG. 2 is a flow chart of a testing, monitoring, and compensation process 200 implemented by the mobile application monitoring system. At a block 205, the system receives a new or modified (e.g., a newly-released version) application from an application provider. Such application may be submitted electronically by the application provider and may be automatically queued for processing by the mobile application monitoring system.

At a block 210, the system determines what network services 135 or device services are utilized by the application. The network operator may charge different amounts to the application provider depending on the services that as used by the application. The greater the value that the service delivers to the application, or the more resources that are required to deliver the service by the network provider, the greater amount that the application developer would be charged to utilize the service. Examples of services that might be utilized by applications include:

Location Information—The location of the mobile device, either generally (e.g., within a certain city or state) or specifically based on GPS, triangulation, or other location technology.

Presence Information—The current state of another user, e.g., an indication that another user is currently on a voice call or in a meeting based on calendar information contained on the other user's mobile device.

Demographic Information—Demographic information about the user or other users of mobile devices.

Data Storage—File transfer, storage, or processing that the network operator may provide.

User Interfaces—Certain user interfaces may be provided by the network operator for use in the application. For example, the network operator may have a unique menu structure that uses avatars of customers. The network operator may provide and update avatars to application providers so that the avatars may be incorporated into the application interface.

At a block 215 the system tests the application in order to determine whether the application conforms to network APIs and other requirements. For example, if the application makes services calls to one or more network services 135 offered by the system, the system may verify that the service calls transmit the appropriate data in accordance with network service APIs. The system may also verify that the application operates in a transparent manner that allows the application to be monitored by the system.

At a block 220, the system simulates the impact of the application on the network and on a mobile device. The application impact on the network may take a variety of forms, but may include such factors as:

Bandwidth Consumption—The use of bandwidth by the application, measured either by peak use (i.e., megabits per second) or cumulative use (megabits/month/user).

Network Services—The number of times and frequency that network services 135 are accessed by the application.

Network Access Points—The number and type of network access points that are utilized by the application.

Other impacts on the network that can't easily be estimated will be discussed in further detail below. The application impact on a mobile device may take a variety of forms, but may include such factors as:

Battery Life—The effect that the application has on the battery life of a device. For example, an application may keep the backlight on a device display on for an extended period, thereby draining the battery and impacting customer satisfaction.

Memory Footprint—The amount of device memory that is consumed by the application, whether at installation or at run-time. Too large of a memory footprint may negatively impact device performance.

Concurrent Processes—The number of concurrent CPU processes that are initiated on the mobile device, thereby impacting the ability of the device to run background processes.

At a block 225, the system sets the initial revenue share that determines how application revenue will be shared between the network operator and the application provider when the application operates over the network. As previously described, the network operator or application provider will typically charge the consumer a fee for access to a particular application. The fee charged to a consumer may be determined by the application provider, by the network operator, by a third-party distributor/aggregator, or by a combination of one or more of the aforementioned or other parties. The consumer may be charged a recurring fee (e.g., a monthly or yearly fee), a one-time flat fee, no fee provided that the consumer agrees to receive advertising (i.e., advertising revenue is collected and a portion delivered to the network operator), or a variable amount under a fee arrangement. A portion of the revenue received by the network operator is shared with the application provider.

Figure 3:
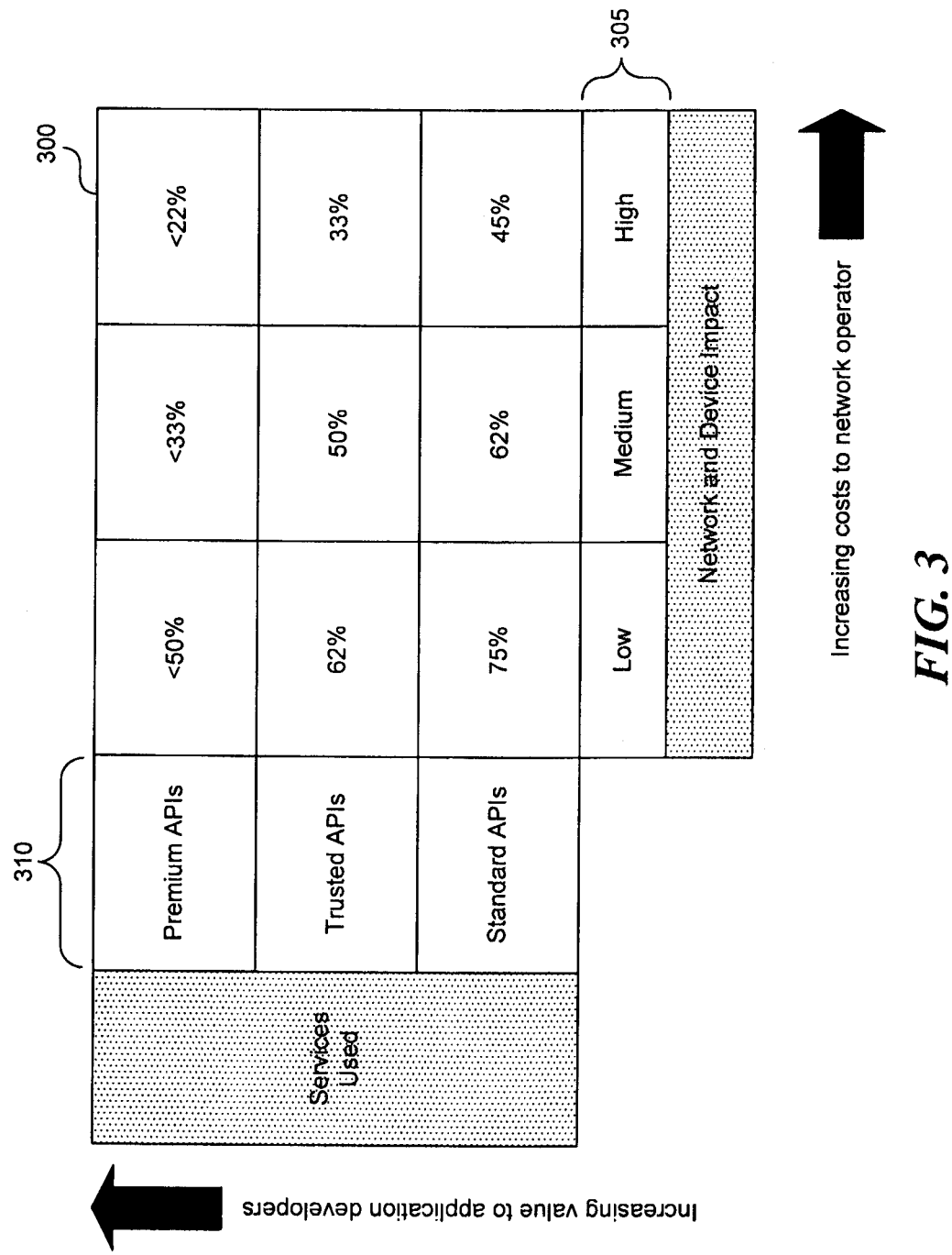
FIG. 3 is a block diagram of a variable reward table utilized in the compensation process by the mobile application monitoring system.

FIG. 3 is a variable reward table 300 that depicts an example of the amount of revenue that may be shared with an application provider based on the operational characteristics of an application. An application is classified, and a revenue share thereby determined, by assigning the application to one of the cells within the table. The x-axis 305 of the variable reward table represents a blended measure of the network and device impact that is generated by the application. While three ranges are depicted in the table ("low," "medium," and "high"), it will be appreciated that a greater or lesser number of ranges may be utilized by the system. In general, the greater the impact that the application has on the network and/or device, the less revenue is shared by the application provider. For example, looking at the first row corresponding to "standard APIs," the application provider will share in 75% of the received revenue if its application has a low impact on the network and/or device, 62% of the revenue if its application has a medium impact on the network and/or device, and only 45% of the revenue if its application has a high impact on the network and/or device. It will be appreciated that the revenue share may drop off more quickly (i.e., in a non-linear fashion) the greater the impact the application has on the network and/or device in order to encourage application providers to minimize the impact that their application on the network operator and consumers. By using network and device resources wisely, the application provider will profit more from its application.

The y-axis 310 of the variable rewards table reflects the complexity and/or value of the services used by the application. Three ranges are provided in the table: "standard APIs" which are simple, low-cost, or low value services; "trusted APIs" which are services of medium complexity, cost or value; and "premium APIs" which are services of high complexity, cost, or value. For example, a standard API may refer to a service that draws to the mobile device screen and intercepts button requests when the application is in the foreground, a trusted API may refer to a service that returns an age and gender of the user based on stored demographic information, and a premium API may refer to a service that returns a mobile device location based on GPS positioning technology. The more complex or valuable the service, the greater the amount the network operator may charge to access the service. In general, therefore, the greater the complexity or value of the utilized service, the less revenue share the application developer will receive for its application. As an example, if an application operates in the first column corresponding to a "low" network and device impact, the application provider will receive 75% of the revenue if its application uses standard APIs, 62% if its application uses trusted APIs, and <50% of the revenue if its application uses premium APIs. The premium API value is specified as a range since the cost of such services may be sufficiently large enough for the network operator and application provider to negotiate the actual revenue share for applications falling in that category.

It will be appreciated that an application may often use two or more services during operation. When two or more services are used, a blended level of complexity or value may be calculated in order to assign the appropriate revenue share to the application. Alternatively, the highest level of complexity or value may be used to assign the appropriate revenue share. Other algorithms to determine the level of complexity of services may also be used. Also, while three ranges of complexity are depicted, it will be appreciated that a greater or lesser number of ranges may be used in the variable reward table. Those skilled in the art will appreciate that the percentages depicted in the variable rewards table are merely representative, and all the cells in the table or each cell in the table may represent a different model under which revenue is shared. For example, a cell may represent a fixed cost paid to the network operator (e.g., $1/month), a revenue sharing arrangement (e.g., 75% of collected revenue), a variable amount depending on the number of applications (e.g., $1/month for the first 10,000 applications, $0.90 for the next 100,000 applications, etc.), or any other model or combination of models (e.g. $0.25/month plus 50% of collected revenue, $0.50/months plus 25% of advertising revenue). All cells in the variable rewards table may use the same model, groups of cells may use the same model, or each cell may use a different model.

In some embodiments, the revenue share will decrease more quickly as the classification of an application moves to the right in the variable reward table 300 (i.e., as the application has a greater network/device impact) as compared with the rate of decrease as the application moves upward in the table (i.e., as the application uses resources of greater sophistication or higher value). The difference in revenue share change is to encourage application developers to use more sophisticated and valuable services in order to benefit consumers, while at the same time strongly discouraging the application providers from having too great an impact on the network and/or device. For example, an application developer creating an application using only standard APIs and having low network/device impact will receive a 75% share of revenue from that application, while an application developer creating an application using premium APIs and having a high network/device impact will receive less than a 22% share of revenue from that application. If the network operator therefore receives $4/month from a user, the application developer receives $3/month under the first scenario yet only $0.88/month under the second scenario. The use of the variable reward table therefore strongly encourages good design behavior from application developers.

Returning to FIG. 2, at block 230 the system sets the revenue share based on the simulation results. The system notifies the application provider of the preliminary revenue share, such as via email or via a dashboard as described herein. If the application provider is not satisfied with the proposed revenue share, the application provider may attempt to re-engineer its application to improve the application's performance. Alternatively, the application provider may withdraw its application from being considered for release on the network. At a block 235, if the application provider agrees to the set revenue share, the application is released on the network operator's network and allowed to be downloaded, installed, and run on mobile devices. As part of the deployment process, the network operator will typically ensure that it tracks installations of the application. Such tracking may be accomplished by building a dataset that correlates unique application identification numbers with mobile device identifiers. The network operator may also require the application provider to build functionality into the application to allow the application to be immediately disabled should adverse network problems ever start to arise as a result of the application.

At a block 240, the system monitors the application performance and impact on both the network and on the device. Monitoring may occur in a variety of different ways, such as requiring the application to route all messages or service calls through the system so that the system may observe the network traffic associated with the application. The mobile device may also periodically submit status reports to the system, providing an aggregate picture of the health of all applications operating on the mobile device. Other ways of monitoring the application include installing a software program on the mobile device that reports message and data traffic on an application-by-application basis, installing and utilizing network monitoring hardware that is application aware, and/or logging requests for services on a per-application basis. The system may monitor applications on a continuous, periodic, or sporadic basis depending on the type of the application and the expected performance of the application. For example, an application classified as "high" impact using "premium APIs" as depicted in the variable reward table may be monitored more frequently and closely than an application classified as "low" impact using "standard APIs." Moreover, the frequency of monitoring may decrease the longer an application has existed on mobile devices. For example, at a certain point monitoring may cease for well-established applications.

Figure 4:
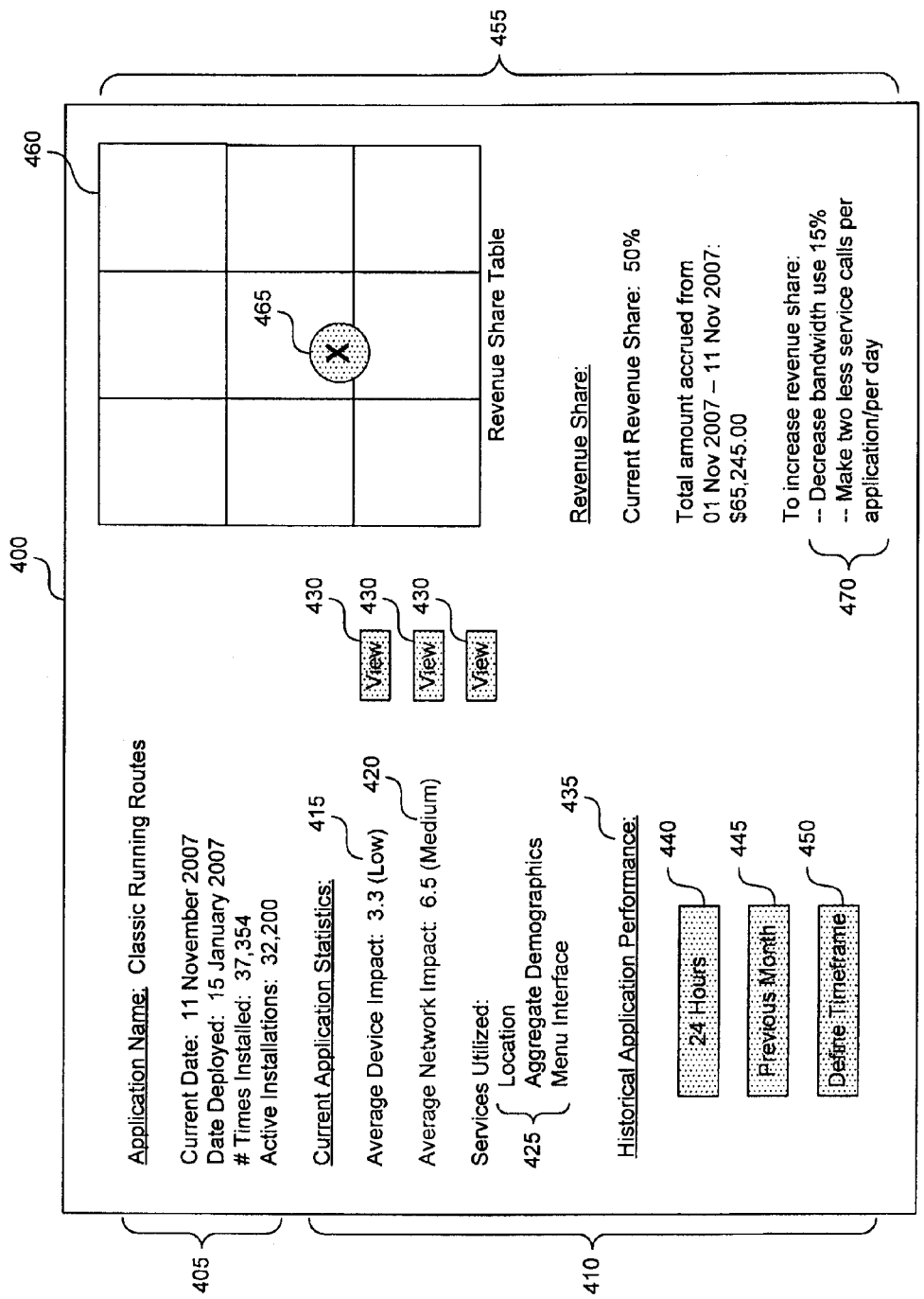
FIG. 4 is a screenshot of a dashboard used to monitor the performance of a mobile application.

At a block 245, the system displays the performance data in a form that allows the application provider to view the performance of the application. A representative dashboard 400 to allow the application provider to view performance data associated with a particular application is depicted in FIG. 4. The dashboard 400 includes three regions that provide different types of data about the application. A first region 405 includes various details about the application deployment on mobile devices. For example, the first region includes the name of the application, the current date, the date the application was first deployed, and the number of installed and active copies of the application. Various other details about the deployment, such as the current version number or rate of application installation may also be provided by the system.

A second region 410 of the dashboard 400 includes various statistics about the operation of the application. In an "average device impact" field 415, the system provides a numerical assessment (e.g., on a scale of 1 to 10 where "1" is good and "10" is bad) of the impact of the application on the mobile device. The number may be derived by weighting the various device impacts that were previously described herein. In an "average network impact" field 420, the system provides a numerical assessment of the impact of the application on the network. Again, the number may be derived by weighting the previously-described network impacts. In a "services utilized" list 425, the system may list the various services that are utilized by the application. Clicking on each service may take the user to an additional screen providing information about that service. A "view" button 430 is provided next to fields 420, 425, and list 430. When a user selects the view button, the system may generate a more detailed report (not shown) that lists the data behind the associated rating or list. The greater detail provided by the report may allow the application provider to better assess the performance of an application and determine how to improve the performance in a manner that increases the revenue share of the application. The second region of the dashboard 400 also includes a "historical application performance" section 435. The system populates the historical performance section with a number of buttons that allow the application provider to view the past performance of an application. For example, the system includes a "24 hours" button 440 to allow the application provider to view performance data over the last 24 hours, a "last month" button 445 to allow the application provider to view the performance data over the last 30 days, and a "define timeframe" button 450 to allow the application to view performance data over a specified date range. The historical performance section 435 may be particularly valuable to an application provider that periodically releases new versions of applications in order to allow the application provider to compare and troubleshoot changes in performance that occur between versions.

A third region 455 of the dashboard 400 is generated by the system to convey revenue share information about the application to the application provider. At the top of the third region, a variable reward table 460 is replicated for the application provider. The reward table may or may not display the actual revenue share numbers in the table. The reward table does display, however, a graphical indication 465 of where the application has been classified and is currently operating within the table. The graphical indication, in this case an "X" in the table, allows the application provider to quickly see where there application is placed with respect to other table cells that would provide a higher revenue share. For example, in the depicted table in FIG. 4, the "X" is located very close to the boundary with the lowest row in the table. Since moving to the lowest row would increase the revenue share of the application, the application provider may elect to reengineer the application's use of services in an attempt to move the application lower in the table. The application provider might attempt to reengineer the use of services before reengineering to improve the network or device impact, because the graphical proximity of the "X" to the lowest row in the table indicates that it may be easier to achieve classification into the lowest row rather than classification into the farthest left (i.e., lower) column.

Located in the third region 455 beneath the variable reward table 460 is further information about the revenue share associated with the application. The system may provide the current revenue share associated with the application, as well as an accounting of the accrued revenue that is to be shared under the agreement between the application provider and the network operator. The system may also provide one or more recommendations 470 to the application provider about ways to improve the performance of the application and derive a larger revenue share. While the application provider may be able to derive such improvement from the other information that is presented to it, the system facilitates the process by providing the most efficient changes that it determines based on the variable reward table.

While certain performance data is provided in the dashboard 400, those skilled in the art will appreciate that a greater or lesser amount of data may be provided to the application provider. One advantage of the dashboard is that it is a self-service interface that encourages the application provider to monitor its application and improve the application in a manner that is beneficial to the network operator. In some embodiments, however, the dashboard may be omitted by the system and the information provided to the application provider in another form, such as periodic audit reports, email reporting, etc. The performance data may be provided on a real-time, periodic, or sporadic basis to the application provider.

Returning to FIG. 2, at a decision block 250 the system determines whether a deployed application is exceeding one or more network or device thresholds. In certain cases, an application may malfunction or may begin to perform materially outside the simulated impact on the device and network or outside of the typical actual measured impact on the device and network. When an application exceeds normal operational fluctuations and begins to materially impact network operations or the mobile device user experience, the system may elect to terminate the application. At a block 255, the system will therefore halt, disable, and/or remove the application from mobile devices when the predetermined thresholds have been exceeded. The testing, monitoring, and revenue sharing process 200 then halts with respect to the particular application until appropriate modifications can be made to the application to remedy the unexpected behavior.

If the application is operating within normal performance boundaries, processing continues to decision block 260. At block 260 the system determines whether the application is continuing to operate within the parameters associated with the previously-classified revenue share. The revenue share associated with an application may change for a variety of reasons. For example, the application is initially classified by simulating the performance of the application. When the application is actually deployed to mobile devices, the application may behave in a different manner than when simulated. If so, the application should be re-classified in the variable reward table based on the actual performance. Such a reclassification may be up or down, of course, depending on whether the application performs better or worse than simulated. As another example, there are a number of network impacts that cannot be simulated before the deployment of an application. Some impacts that cannot be simulated include:

Customer Care Resources—The call volume from mobile device users to customer care based on the application, or other load placed on self-help systems.

Refund Rates—The number of refunds that an application triggers per unit of time or per volume of sales or trial.

Although these network impacts cannot be simulated, when measured after deployment of the application they may be taken into account when measuring the overall impact of the application on the network. As a result of these impacts, the classification of the application in the variable reward table may need to change. As yet another example, when deployed in mobile devices the mobile device users may use the application in a much different fashion than originally anticipated. Although the application may therefore be operating as expected, the unanticipated use of the application may significantly impact the network or device. As a result, the classification of the application may need to be altered. Note that a classification change may only be warranted based on a continued change in application behavior. Certain transient changes in application performance may be ignored if they are short in length and if it is difficult to assess a root cause.

If the classification of the application needs to be altered, at a block 265 the system re-classifies the application within the variable reward table and thereby revises the revenue share that is to be received by the application provider. At a block 270 the application provider is notified of the modified revenue share and may be given an explanation of the factors behind the change to the revenue share. As a result of the modification, the application provider may choose to accept the revised amount, may choose to re-engineer the application in order to achieve the previous revenue share numbers, or may choose to remove their application from the mobile devices.

Regardless of whether the system continues operating under a prior revenue sharing arrangement or under a modified revenue sharing arrangement, at a block 275 the system accounts for any revenue that is owed to the application provider and stores appropriate data in the accounting data set 145. On a continuous or periodic basis, the accounting data is provided to the accounting system 165 in order to effectuate payment to the application provider. Processing then continues to block 240 where the system continues to monitor the performance of the application.

While the process described in FIG. 2 is directed to monitoring the performance of a single application, those skilled in the art will appreciated that the system may implement the process 200 to test, monitor, and compensate for any number of applications that are deployed on the network operator's network. Various enhancements or improvements may be made when scaling the process 200 to accommodate a large number of applications.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A system for sharing revenue between an application provider associated with an application that operates on a mobile device and a network operator that operates a wireless telecommunications network that is utilized by the mobile device, the system comprising:
  a memory storing computer-executable instructions for generating:
    a monitoring module configured to monitor the operation of an application that is created by an application provider and resides on a mobile device, the mobile device utilizing a wireless telecommunications network operated by a network operator, the monitoring module:
      measuring an impact on the wireless network by the operation of the application,
      assessing the operation of the application to identify one or more services utilized during the operation of the application, the services accessed through the wireless network via an application program interface (API), and
    determining a revenue sharing arrangement that specifies a distribution of revenue between the application provider and the network operator for operation of the application on mobile devices, wherein the revenue sharing arrangement is based on the measured impact of the application on the wireless network and the cost of the identified services utilized during the operation of the application, wherein the cost of the identified services is based on a complexity or value of the identified services; and
  a reconciliation module configured to direct the distribution of revenue associated with the application to the application provider and the network provider in accordance with the revenue sharing arrangement; and
  a processor for executing the computer-executable instructions stored in the memory.

2. The system of claim 1, wherein the reconciliation module is further configured to distribute a greater amount under the revenue sharing arrangement to the network operator if complex services are utilized and a lesser amount to the network operator if simple services are utilized.

3. The system of claim 1, wherein the reconciliation module is further configured to distribute a greater amount under the revenue sharing arrangement to the network operator if services of greater value are utilized and a lesser amount to the network operator if services of lesser value are utilized.

4. The system of claim 1, wherein the reconciliation module is further configured to distribute a greater amount under the revenue sharing arrangement to the network operator as the number of utilized services increases.

5. The system of claim 1, wherein the impact on the wireless network includes the bandwidth consumed by the application.

6. The system of claim 1, wherein the impact on the wireless network includes the frequency that services are called by the application.

7. The system of claim 1, wherein the impact on the wireless network includes the number and type of access points utilized by the application.

8. The system of claim 1, wherein the impact on the wireless network includes the volume of customer care calls as a result of the application.

9. The system of claim 1, wherein the reconciliation module is further configured to distribute an increased amount to the network operator as the impact on the wireless network increases.

10. The system of claim 1, wherein the monitoring module is further configured to monitor the operation of the application on a mobile device to measure an impact on the mobile device imposed by the application, and wherein the reconciliation module is further configured to modify the revenue sharing arrangement based on the measured impact on the mobile device.

11. The system of claim 10, wherein the impact on the mobile device includes the processing burden on the mobile device processor.

12. The system of claim 1, wherein the revenue associated with the application includes advertising revenue.

13. The system of claim 1, wherein the reconciliation module is further configured to determine a revenue sharing arrangement by accessing a table having one axis corresponding to the impact of the application on the wireless network and another axis corresponding to the utilized services.

14. The system of claim 1, further comprising a user interface module configured to generate an interface on a display device for the application provider to view the measured impact of the application on the wireless network.

15. The system of claim 14, wherein the user interface module is further configured to generate an interface that depicts how to increase the revenue share to be paid to the application provider for operation of the application on mobile devices.

16. The system of claim 1, wherein the services are hosted by an operator of the wireless network, by a provider of the application, or by a third party.

17. A method in a computing system of charging an application provider to allow an application to operate on mobile devices and utilize a wireless telecommunications network operated by a network operator, the method comprising:
monitoring by the computing system the operation of an application created by an application provider and residing on a mobile device to measure an impact on the wireless network by the operation of the application;
assessing by the computing system the operation of the application to identify one or more services utilized during the operation of the application, the services accessed through the wireless network via an application program interface (API);
determining by the computing system a cost to be paid by the application provider for operation of the application on mobile devices, wherein the determined cost is based on the measured impact of the application on the wireless network and the cost of the identified services utilized during the operation of the application, and further wherein the cost of the identified services is based on a complexity or value of the identified services; and
charging by the computing system the application provider in accordance with the determined cost.

18. The method of claim 17, wherein the determined cost is increased if complex services are utilized and decreased if simple services are utilized.

19. The method of claim 17, wherein the determined cost is increased if services of greater value are utilized and decreased if services of lesser value are utilized.

20. The method of claim 17, wherein the determined cost increases as the number of utilized services increases.

21. The method of claim 17, wherein the impact on the wireless network includes the bandwidth consumed by the application.

22. The method of claim 17, wherein the impact on the wireless network includes the frequency that services are called by the application.

23. The method of claim 17, wherein the impact on the wireless network includes the number and type of access points utilized by the application.

24. The method of claim 17, wherein the impact on the wireless network includes the volume of customer care calls as a result of the application.

25. The method of claim 17, further comprising monitoring the operation of the application on a mobile device to measure an impact on the mobile device imposed by the application, wherein the determined cost is further based on the measured impact on the mobile device.

26. The method of claim 25, wherein the impact on the mobile device includes the processing burden on the mobile device processor.

27. The method of claim 17, wherein the determined cost is calculated by a revenue share, with a portion of revenue associated with the application paid to a network operator and a portion of the revenue associated with the application paid to the application provider.

28. The method of claim 17, further comprising generating an interface for the application provider to view the measured impact of the application on the wireless network.

29. The method of claim 28, wherein the interface for the application provider depicts how to lower the cost to be paid for operation of the application on mobile devices.

30. The method of claim 17, wherein the services are hosted by an operator of the wireless network, by a provider of the application, or by a third party.

31. A method in a computing system of determining an amount to charge an application provider to allow an application to operate on mobile devices and utilize a wireless telecommunications network operated by a network operator, the method comprising:
receiving by the computing system an application from an application provider, the application to be deployed on mobile devices that utilize a wireless network;
testing by the computing system the received application to estimate an impact on the wireless network by the operation of the received application;
assessing by the computing system the operation of the received application to identify one or more services utilized during the operation of the application, the services accessed through the wireless network via an application program interface (API);
determining by the computing system an initial cost to be paid by the application provider for operation of the application on mobile devices, wherein the initial cost is based on the estimated impact of the application on the wireless network and the cost of the identified services utilized during the operation of the application, and further wherein the cost of the identified services is based on a complexity or value of the identified services; and
charging by the computing system the application provider in accordance with the initial cost.

32. The method of claim 31, wherein the impact on the wireless network includes the bandwidth consumed by the application.

33. The method of claim 31, wherein the impact on the wireless network includes the frequency that services are called by the application.

34. The method of claim 31, wherein the impact on the wireless network includes the number and type of access points utilized by the application.

35. The method of claim 31, wherein the impact on the wireless network includes the volume of customer care calls as a result of the application.

36. The method of claim 31, further comprising testing the received application on a mobile device to estimate an impact on the mobile device by the operation of the application, wherein the initial cost is further based on the estimated impact on the mobile device.

37. The method of claim 36, wherein the estimated impact on the mobile device includes the processing burden on the mobile device processor.

38. The method of claim 31, wherein the initial cost and final cost are calculated by a revenue share, with a portion of revenue associated with the application paid to a network operator and a portion of the revenue associated with the application is paid to the application provider.

39. The method of claim 31, further comprising generating an interface for the application provider to view the impact of the application on the wireless network.

40. The method of claim 39, wherein the interface for the application depicts how to lower the cost to be paid for operation of the application on mobile devices.

41. A system for determining a revenue sharing arrangement between an application provider associated with an application that operates on a mobile device and a network operator that operates a wireless telecommunications network that is utilized by the mobile device, the system comprising:
- a memory storing computer-executable instructions for generating:
  - a testing module that receives an application from an application provider, the application to be deployed on mobile devices that utilize a wireless network operated by a network operator, the testing module testing the received application to estimate an impact on the wireless network by the operation of the received application and assessing the operation of the received application to identify one or more services utilized during the operation of the application, the services accessed through the wireless network via an application program interface (API);
  - an estimation module for determining an initial revenue sharing arrangement that specifies a distribution of revenue between the application provider and the network operator for operation of the application on mobile devices, wherein the initial revenue sharing arrangement is based on the estimated impact of the application on the wireless network and the cost of the identified services utilized during the operation of the application, and further wherein the cost of the identified services is based on a complexity or value of the identified services; and
  - a reconciliation module for directing the distribution of revenue associated with the application to the application provider and the network provider in accordance with the initial revenue sharing arrangement following installation of the application on mobile devices; and
- a processor for executing the computer-executable instructions stored in the memory.

42. The system of claim 41, further comprising a monitoring module for monitoring the actual impact of the application on the wireless network following installation of the application on mobile devices and determining a final revenue sharing arrangement based on the actual impact of the application, wherein the reconciliation module subsequently directs the distribution of revenue in accordance with the final revenue sharing arrangement.

43. The system of claim 42, wherein the monitoring module is configured to perform the monitoring on a periodic basis.

44. The system of claim 42, wherein the monitoring module is configured to perform the monitoring on a continuous basis.

45. The system of claim 42, wherein the actual impact on the wireless network includes the bandwidth consumed by the application.

46. The system of claim 42, wherein the actual impact on the wireless network includes the frequency that services are called by the application.

47. The system of claim 42, wherein the actual impact on the wireless network includes the number and type of access points utilized by the application.

48. The system of claim 42, wherein the actual impact on the wireless network includes the volume of customer care calls as a result of the application.

49. The system of claim 42, further comprising a user interface module configured to generate an interface on a display device for the application provider to view the actual impact of the application on the wireless network.

50. The system of claim 49, wherein the user interface module is further configured to generate an interface that depicts how to increase the revenue share to be paid to the application provider for operation of the application on mobile devices.

51. The system of claim 41, wherein the testing module further tests the received application on a mobile device to estimate an impact on the mobile device by the operation of the application, and wherein the initial revenue sharing arrangement is further based on the estimated impact on the mobile device.

52. The system of claim 51, wherein the estimated impact on the mobile device includes the processing burden on the mobile device processor.

53. The system of claim 41, wherein the revenue associated with the application includes advertising revenue.

54. The system of claim 41, wherein the reconciliation module is further configured to determine the initial revenue sharing arrangement by accessing a table having one axis corresponding to the impact of the application on the wireless network and another axis corresponding to the utilized services.

* * * * *